(12) United States Patent
Kulakov et al.

(10) Patent No.: US 9,107,125 B2
(45) Date of Patent: Aug. 11, 2015

(54) REGISTRATION OF RADIO NETWORK CHANGE BASED ON A CS FALLBACK MECHANISM

(71) Applicant: Vodafone Holding GmbH, Düsseldorf (DE)

(72) Inventors: Alexej Kulakov, Düsseldorf (DE); Peter Wild, Krefeld (DE); Yang Lu, Düsseldorf (DE); Jürgen Caldenhoven, Düsseldorf (DE)

(73) Assignee: Vodafone Holding GmbH, Dusseldorf (DE)

( * ) Notice: Subject to any disclaimer, the term of this patent is extended or adjusted under 35 U.S.C. 154(b) by 279 days.

(21) Appl. No.: 13/668,481

(22) Filed: Nov. 5, 2012

(65) Prior Publication Data

US 2013/0142169 A1  Jun. 6, 2013

(30) Foreign Application Priority Data

Nov. 4, 2011  (DE) .......................... 10 2011 085 785

(51) Int. Cl.
*H04W 36/14* (2009.01)
*H04W 36/00* (2009.01)
*H04W 60/00* (2009.01)

(52) U.S. Cl.
CPC .......... *H04W 36/14* (2013.01); *H04W 36/0022* (2013.01); *H04W 60/00* (2013.01)

(58) Field of Classification Search
CPC .. H04W 36/14; H04W 36/0022; H04W 60/00
See application file for complete search history.

(56) References Cited

U.S. PATENT DOCUMENTS

| | | | | |
|---|---|---|---|---|
| 2008/0123673 | A1* | 5/2008 | Lee | 370/412 |
| 2011/0188451 | A1* | 8/2011 | Song et al. | 370/328 |
| 2011/0216645 | A1* | 9/2011 | Song et al. | 370/216 |
| 2012/0020290 | A1* | 1/2012 | Kanauchi et al. | 370/328 |
| 2012/0270552 | A1* | 10/2012 | Shi et al. | 455/438 |
| 2012/0300750 | A1* | 11/2012 | Chin et al. | 370/331 |

* cited by examiner

*Primary Examiner* — Curtis A Alia
(74) *Attorney, Agent, or Firm* — International IP Law Group, PLLC (57) ABSTRACT

A method for the switchover of a mobile terminal device from a first radio network of a mobile radio system to a second radio network is described. The switchover is carried out on the basis of a CS fallback mechanism, and whereby, on the basis of the switchover, the mobile terminal device logs on to a base station of the second radio network in order to establish a connection. In conjunction with the log-on, the mobile terminal device transmits a notification pertaining to the CS fallback mechanism to the base station, and the base station registers the log-on of the terminal device as a function of the notification. Moreover, a base station and to a mobile terminal device for carrying out the method are also described herein.

7 Claims, 3 Drawing Sheets

REGISTRATION OF RADIO NETWORK CHANGE BASED ON A CS FALLBACK MECHANISM

CROSS REFERENCE TO RELATED APPLICATION

This application claims priority to German (DE) Patent Application No. 102011085785.0, filed on Nov. 4, 2011, the contents of which are incorporated by reference as if set forth in their entirety herein.

BACKGROUND

The claimed subject matter relates to the switchover of mobile terminal devices from a first radio network of a mobile radio system to a second radio network within the scope of a CS (circuit-switched) fallback mechanism. The claimed subject matter relates to a method for carrying out such a mobile terminal device switchover, to a base station of a radio network that can be used to carry out the switchover as well as to a mobile terminal device that can be used to carry out the switchover.

The term, 4G (or Long-Term Evolution (LTE) refers to mobile radio networks that have been standardized by the $3^{rd}$ Generation Partnership Project (3GPP). In the development of these networks, the transmission of data is in the foreground, ahead of establishing voice calls. In contrast to the mobile radio networks of the previous generation, 4G networks make use of packet-switched (PS) connections between the networks and the associated mobile terminal devices. There are no provisions for circuit-switched connections of the type provided in 2G networks according to the Global System for Mobile Communications (GSM) standard, and in 3G networks according to the Universal Telecommunications (UMTS) standard, for voice communication. The 4G networks establish voice calls by using a packet-switched connection as a service that is made available to the 4G networks by the IP multimedia subsystem (IMS).

In the initial phase of operation of 4G networks, the services of the IMS may merely be available to a limited extent or not at all. However, in order to give mobile terminal device users the ability to make voice calls, a circuit-switched (CS) fallback mechanism is provided, which is described in the 3GPP specification TS 23.272. Here, in order for a mobile terminal device to establish a voice call that is made via a circuit-switched connection, it switches over from the 4G network in a defined sequence to a 2G or 3G network (or to the CS domain of such a network) that is spatially superimposed over the 4G network. The network is switched over from the 4G radio network to the 2G or 3G radio network and, after the radio network switchover, the core network components of the 2G or 3G network that function on the basis of a circuit-switched mechanism.

In the case of an outgoing (mobile originated—(MO)) call, the mobile terminal device first informs the 4G network that it would like to make a voice call by the CS fallback. After a prompt by the 4G network to this effect, the terminal device switches over to a cell of a 2G or 3G network that it has selected itself or that is prescribed by the 4G network, and the terminal device then logs on to this network. The voice call is then established. In the case of an incoming (mobile terminated—(MT)) call, the terminal device is first informed by the 4G network about the call. After an acknowledgement and after a prompt by the 4G network to this effect, the terminal device then switches over to a cell of a 2G or 3G network that it has selected itself or that is prescribed by the 4G network.

After the log-on to this network, the terminal device signals its availability to accept the call. Then the call is established in the 2G or 3G network on the basis of circuit-switched mechanism. The network is switched over from the 4G network to the 2G or 3G network and, after the radio network has switched over, the circuit-switched core network components of the 2G or 3G network are used.

Currently, the implementation of the CS fallback mechanism entails the problem that the base station of the radio network via which the circuit-switched connection is established, for example, the base station of the 2G or 3G network, does not receive any information about the fact that the access by a terminal device is being carried out on the basis of a radio network switchover within the scope of the CS fallback mechanism. As a result, for instance, it is not possible to determine a failure rate of radio network switchovers carried out within the scope of a CS fallback mechanism and, if a high failure rate is found, to take appropriate measures to prevent such failures.

SUMMARY

The claimed subject matter relates to the switchover of mobile terminal devices from a first radio network of a mobile radio system to a second radio network within the scope of a circuit-switched (CS) fallback mechanism. The claimed subject matter relates to a method for carrying out such a mobile terminal device switchover, to a base station of a radio network that can be used to carry out the switchover as well as to a mobile terminal device that can be used to carry out the switchover.

According to a first aspect, the claimed subject matter proposes a method for switching a mobile terminal device over from a first radio network of a mobile radio system to a second radio network. The switchover is carried out on the basis of a CS fallback mechanism and the mobile terminal device logs on to a base station of the second radio network on the basis of the switchover in order to establish a connection. The method is characterized in that, in conjunction with the log-on, the mobile terminal device transmits a notification to the base station indicating that the CS fallback mechanism has been used, and the base station registers the access of the terminal device as a function of the notification.

According to another aspect of the claimed subject matter, a base station for use in a second radio network of a mobile radio system is being proposed. Mobile terminal devices can be logged on to the base station in order to establish a connection. The base station is configured to receive a notification sent by a mobile terminal device in conjunction with the log-on, and to register the log-on of the mobile terminal device as a function of the received notification, whereby the notification provides information indicating that the log-on of the mobile terminal device is being carried out on the basis of a switchover from a first radio network to the second radio network within the scope of a CS fallback mechanism.

Moreover, according to one aspect of the claimed subject matter, a mobile terminal device for use in a mobile radio system is being proposed. The mobile terminal device is configured so that, on the basis of a CS fallback mechanism, it can carry out a switchover from a first radio network of the mobile radio system to a second radio network of the mobile radio system and, on the basis of the switchover, it can log on to a base station of the second radio network in order to establish a connection. Moreover, the mobile terminal device is configured in such a way that, in conjunction with the log-on, it transmits a notification to the base station that can be registered in the base station, indicating that the CS fallback mechanism has been used.

Knowledge about the fact that the log-on of a mobile terminal device is carried out on the basis of a radio network switchover within the scope of a CS fallback mechanism is received by a base station in the form of a notification that the terminal device transmits to the base station. The notification can be registered in the base station, that is to say, it can be recognized and interpreted by the base station. As a function of the received notification, the log-on of the terminal device is registered in the base station. Here, the log-on can be registered as a log-on that is being carried out within the scope of a CS fallback mechanism. As a result, the log-on of the terminal device can be registered within the radio network of the mobile radio system and relative to the base station of the second radio network in which the log-on is carried out. This permits an evaluation of log-on attempts in terms of individual units of the radio network, and this evaluation can be used, for example, for a systematic optimization of the CS fallback mechanism within the radio network.

The connection that the terminal device aims to establish by logging on to the base station of the second radio network may be a circuit-switched connection via which the terminal device accesses a service provided by the mobile radio network such as, for instance, a service for voice calls. An incoming call to the terminal device or an outgoing call from the terminal device can be established via the connection.

One embodiment of the claimed subject matter provides that a checking procedure is carried out to ascertain whether the log-on of the terminal device to the base station of the second radio network is successful, and the log-on of the terminal device is registered, together with an outcome indicator that is determined as a function of the result of the checking procedure. In this manner, a recognized access of a terminal device within the scope of the CS fallback mechanism can be registered in the base station as having been successful or as having failed. This makes it possible, for example, to ascertain failure rates for accesses carried out within the scope of the CS fallback mechanism. The checking procedure to ascertain whether the access is successful, that is to say, whether the terminal device can be successfully logged on to the base station, may be carried out in the base station of the second radio network. A successful log-on may be ascertained when, as a result of the log-on, a call to the terminal device has been established via the connection. By the same token, a successful establishment of the signaling connection can already be considered as a successful log-on. The establishment of a signaling connection precedes the establishment of the call. Signaling messages for establishing the call are exchanged with the terminal device via the signaling connection.

In another embodiment of the claimed subject matter, it is provided that a base station of the first radio network prompts the terminal device to carry out the switchover and, on the basis of the prompt, the base station registers a switchover attempt that has been made within the scope of the CS fallback mechanism. In this manner, by the initial base station of the first radio network can also detect those radio network switchover attempts that already fail before the terminal device can start with the log-on to a base station of the second radio network. Information about such switchover attempts can likewise be used, for example, to determine a failure rate of radio network switchovers within the scope of the CS fallback mechanism.

The log-on of the terminal device may be registered in the base station of the second radio network and/or the switchover attempt is registered in the base station of the second radio network pertaining to a specific radio cell of the second radio network that receives its feed from the base station of the second radio network. This makes it possible, for example, to determine radio cell-specific success statistics of radio network switchovers within the scope of the CS fallback mechanism. Such statistics can be employed, for instance, to optimize the selection of target cells for future radio network switchovers within the scope of the CS fallback mechanism. Thus, in this embodiment, an optimization of the CS fallback mechanism can be carried out on the radio cell level.

A refinement of the claimed subject matter entails that, in an optimization step, at least one network parameter of the first and/or second radio network is modified as a function of the information about radio network switchovers carried out within the scope of the CS fallback mechanism, and this information is registered in the base station of the first and/or second radio network for a plurality of radio network switchovers. This information refers to the accesses carried out within the scope of the CS fallback mechanism that have been registered in the base station of the first radio network and to the access attempts that have been registered in the second base station. The network parameter can be a parameter that influences the selection of the target cell for the radio network switchover to the second radio network.

In one embodiment of the claimed subject matter, a failure rate is ascertained on the basis of log-ons and associated outcome indicators that have been registered in the base station of the second radio network and on the basis of switchover attempts registered in the base station of the first radio network, and according to this failure rate, at least the network parameter is modified in the optimization step. Radio cell-specific failure rates can be determined, for example, in order to modify a parameter that influences the target cell selection.

In one embodiment of the claimed subject matter, it is provided that information about the log-ons registered in the base station of the second radio network and/or the associated outcome indicators are transmitted from the base station of the second radio network to the base station of the first radio network, and that the optimization step is carried out in the base station of the first radio network. Another embodiment provides that information about the log-ons registered in the base station of the second radio network and/or the associated outcome indicators are transmitted from the base station to a maintenance unit of the mobile radio network, and whereby the optimization step is carried out in the maintenance unit. In this process, information about the switchover attempts registered in the base station of the first radio network is transmitted to the maintenance unit.

Moreover, one embodiment of the claimed subject matter is characterized in that, in a request to establish a signaling connection, the notification pertaining to the CS fallback mechanism is transmitted from the mobile terminal device to the base station of the second radio network. As already explained above, the establishment of the signaling connection precedes the establishment of the call. Consequently, this embodiment has the advantage that the log-on, as a log-on within the scope of the CS fallback mechanism, is already registered at an early stage of the log-on process that leads to the call being established.

The first radio network can be a 4G network as was mentioned above. The second radio network can be a 2G and/or a 3G network. However, the claimed subject matter is not limited to these networks nor to the CS fallback mechanism provided for these networks. Rather, the claimed subject matter can also be used with other CS fallback mechanisms in which a mobile terminal device switches over from a first radio network to a second radio network in order to a circuit-switched connection to the terminal device to be established in the second radio network.

The above-mentioned as well as other advantages, special features and practical refinements of the claimed subject matter are also clearly explained on the basis of the embodiments that are described below with reference to the figures.

DETAILED DESCRIPTION OF SPECIFIC EMBODIMENTS

Figure 1:
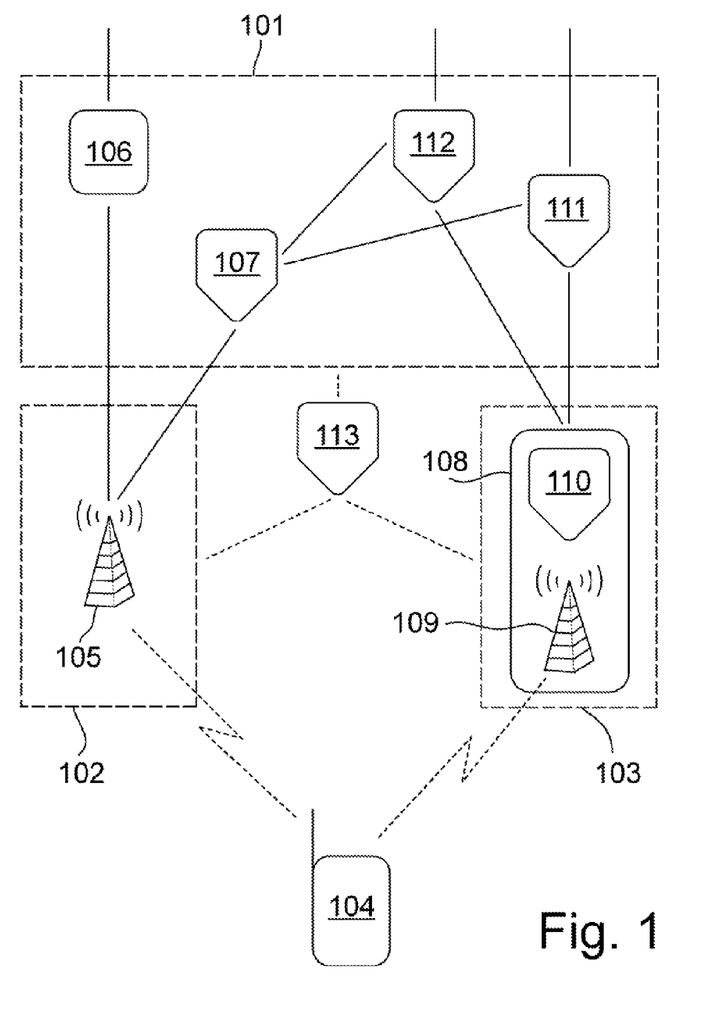
FIG. 1 a schematic depiction of a mobile radio system with a first radio network and several second radio networks in which a CS fallback mechanism is set up, FIG. 2 a schematic flow diagram for the implementation of the CS fallback for an outgoing call, and FIG. 3 a schematic flow diagram for the implementation of the CS fallback for an incoming call.

The mobile radio system shown schematically in FIG. 1 comprises a core network 101 as well as several cellular radio networks 102 and 103 connected to the core network 101 by which mobile terminal devices 104 can be connected wirelessly to the core network 101. The mobile terminal devices 104, of which a single one is shown in FIG. 1 by way of an example, can be mobile terminal devices such as mobile phones, smartphones, notebook computers or the like. By the same token, they can be stationary terminal devices that have a telecommunications modem such as, for example, appropriately equipped personal computers (PCs).

A first radio network 102, also referred to below as a next-generation (NG) radio network, provides a first radio access technology (RAT). The NG-radio network 102 comprises a plurality of cells that each receives their feed from a base station 105 that forms the radio access point for the corresponding radio cell. By way of an example, FIG. 1 shows just one of the base stations 105 of the NG-radio network 102, which are also referred to below as NG-base stations. In one embodiment, the NG-radio network is configured as an Evolved UMTS Terrestrial Radio Access Network (E-UTRAN) in accordance with the LTE standard. In this case, the NG-base stations 105 are eNodeBs in accordance with the LTE standard.

In the core network 101, the components 106, 107 are associated with the NG-radio network 102. The component 106 is a gateway unit that is also referred to below as an NG-gateway unit and that is responsible for forwarding and routing data that is transmitted in the connections established by the NG-radio network 102. These are exclusively packet-switched connections. By such connections, data packets can be exchanged via the NG-radio network 102 and the NG-gateway unit 106 between terminal devices 104 as well as other networks and systems that are connected to the gateway unit 106. Packet-switched data connections to other data networks such as the Internet can be established via the gateway unit 106 and any additional connected systems. In one implementation, the NG-gateway unit 106 is a Serving Gateway (SG) in accordance with the LTE standard.

In order to manage and control the establishment, the maintenance and the termination of radio connections via the NG-radio network 102, the core network 101 has the control unit 107, which is provided for performing tasks relating to the mobility management of mobile terminal devices 104 that are connected to the NG-radio network 102 (that is to say, terminal devices 104 with an active data connection and logged-on terminal devices 104 without an active data connection). The control unit 107 can be a Mobility Management Entity (MME) in accordance with the LTE standard.

Aside from the NG-radio network 102, the mobile radio system comprises at least another radio network 103 that provides additional radio access technology and that is referred to below as an L-radio network (for "Legacy" radio network). Although FIG. 1 shows only one single L-radio network 103, the mobile radio system is not limited to this. On the contrary, there can also be several L-radio networks 103 that are connected to the core network 101.

The L-radio network 103 likewise comprises a plurality of radio cells that each receives their feed from a base station 108 that serves as a radio access point of the radio cell in question. By way of an example, FIG. 1 likewise shows just one of the base stations 108 of the L-radio network 103, which are also referred to below as L-base stations 108. As is shown in FIG. 1, the L-base stations 108 can comprise a radio unit 109, which serves as the actual radio access point, and an associated radio network control unit 110, which serves to control one or more radio units 109. By the same token, the L-base stations 108, similar to the NG-base stations 105, can also be made up of a single unit (and the NG-base stations 105 can comprise several sub-units).

In one embodiment, the L-radio network 103 is configured as a UMTS Terrestrial Radio Access Network (UTRAN) in accordance with the UMTS standard. In this case, an L-base station 108 corresponds to a radio network system (RNS) with a radio unit 109 configured as a NodeB and to a radio network control unit 110 configured as a radio network controller (RNC). By the same token, the L-radio network 103 can also be configured as a GSM EDGE Radio Access Network (GERAN) in accordance with the GSM standard. In this case, an L-base station 108 corresponds to a Base Station Subsystem (BSS) with a radio unit 109 configured as a Base Transceiver Station (BTS) and to a radio network control unit 110 configured as a Base Station Controller (BSC). For example, the mobile radio network can comprise a UTRAN as well as a GERAN. In one embodiment involving several L-radio networks 103, a UTRAN as well as a GERAN can be present, which can be connected to the same components (described below) of the core network 101. As an alternative or in addition to a UTRAN and/or a GERAN, one or more other L-radio networks 103 can be provided.

Circuit-switched connections can be established via the L-radio network 103 that can be used to make voice calls. In order to establish circuit-switched connections, a switching unit 111, which can be configured as Mobile Switching Center (MSC), is associated with the L-radio network 103 in the core network 101. The switching unit 111 controls the establishment, the maintenance and the termination of circuit-switched connections to terminal devices 104 that are connected to the L-radio network 103. It is also possible to establish packet-switched data connections via the L-radio network 103. For purposes of controlling the establishment, the maintenance and the termination of packet-switched data connections as well as for routing and forwarding data packets that are transmitted in the packet-switched connections, the L-radio network 103 is associated with the gateway unit 112, which can be configured as Serving GPRS Support Node (SGSN) and which is also referred to here as an L-gateway unit.

A maintenance unit 113 can be provided for the maintenance of the mobile radio system, including the NG-radio network 102 and the L-radio network 103. This maintenance unit can modify network parameters that are stored in components of the core network 101 and of the radio network 102, 103 and that determine the behavior of the components. For this purpose, it can be provided that components of the core network 101 and of the radio networks transmit information, acquired measured data, to the maintenance unit 113. In the maintenance unit 113, the received information is evaluated and the network parameters are modified as a function of the results of the evaluation. The evaluation as well as the modification can be carried out automatically using stored algorithms and/or on the basis of manual input by an operator.

In the mobile radio network, it is provided that a terminal device 104 that has established a connection via the NG-radio network 102 or that is registered in the NG radio network 102 without an active connection switches over to the L-radio network 103 in order to establish a voice call or in order to utilize other specific services that can be provided by a circuit-switched connection. After the switchover, a circuit-switched connection to the terminal device 104 is established via the L-radio network 103 and via the switching unit 111 associated with said network in the core network 101, and the voice call to the terminal device 104 is established or the service is provided via this circuit-switched connection. Optionally, after the switchover to the L-radio network 103, a data connection to the terminal device 104 can also be established via the L-gateway unit 112 or else a data connection that had been previously established via the NG-radio network 102 and the L-gateway unit 112 associated with it can be switched over to the L-radio network 103 and to the L-gateway unit 112.

The switchover of the terminal device 104 to the L-radio network 103 is carried out within the scope of a CS fallback mechanism. A reason to set up the CS fallback mechanism in the mobile radio system can lie in the fact that the NG-radio network 102 and the associated components of the core network 101 do not permit voice calls to be made. This is the case, for instance, if the core network 101 does not have an IMS that is coupled to the NG-gateway unit 106 and that provides services for establishing voice calls. By the same token, even if the infrastructure is present for providing services for voice calls via the NG-radio network 102, if an IMS is present, it can be desirable for a CS fallback to be carried out at prescribed times and/or by selected terminal devices 104, with a switchover to the L-radio network 103 in order to establish voice connections or to utilize other specific circuit-switched services.

The switchover from the NG-radio network 102 to the L-radio network 103 is made for outgoing (MO) as well as for incoming (MT) calls on the basis of a notification that is sent from the NG base station 105 to the terminal device 104 and that causes the terminal device 104 to make the switchover. In various implementations, the radio cell of the L-radio network 103 to which the terminal device 104 then switches over can be previously selected by the NG base station 105 or by the terminal device 104 itself. The attempts by terminal devices 104 to switch over to the L-radio network 103 within the scope of the CS fallback mechanism that were initiated by the prompt to make the switchover to the L-radio network 103 may be registered by the NG-base station 105. If it is envisaged that the NG-base station 105 specifies the target radio cell (also referred to below simply as the target cell) of the L-radio network 103, then the registration may be carried out in association with the target cell.

After the terminal device 104 has left the NG-radio network 102, the terminal device 104 connects to the L-radio network 103 and logs on to an L-base station 108. During the log-on process, in which first of all, a signaling connection is set up between the L-base station 108 and the terminal device 104, or else after the signaling connection has been established, the terminal device 104 informs the L-base station 108 that it is carrying out a switchover within the scope of the CS fallback mechanism. This information may be sent while the signaling connection is being established, so that it reaches the L-base station 108 at an early point in time. On the basis of this information, the L-base station 108 registers the log-on of the terminal device 104 as a log-on based on the CS fallback mechanism. In an L-base station, with the set-up described above, the registration may be carried out in the radio network control unit 110.

The L-base station 108 can add an outcome indicator to the registration, indicating whether the terminal device 104 was able to successfully log on to the L-radio network 103 or whether the log-on of the terminal device 104 to the L-radio network 103 has failed. A successful log-on may be registered if it was possible to place an incoming or outgoing call via the established circuit-switched connection to the terminal device. The outcome indicator of the success case thus characterizes the successful establishment of the call. In this embodiment, the outcome indicator of the failure case characterizes the cases in which communication between a terminal device 104 and the L-base station 108 for logging on the terminal device 104 has taken place, but in which it was not possible for the log-on process to be completed with a call being established. The checking procedure to ascertain whether the log-on has been successful is carried out in the L-base station 108.

In alternative embodiments, other criteria could also be employed on the basis of which a successful log-on is ascertained. For example, the establishment of a signaling connection between the L-base station 108 and the terminal device 104 can be considered to be a successful log-on. If a handover of a packet-switched connection of the terminal device 104 to the L-radio network is envisaged during the radio network switchover, as explained below, it can also be provided that the success case is only ascertained if the call has been established successfully and the handover has been carried out successfully.

Information about the registered accesses to the L-base station 108 that have taken place on the basis of the CS fallback mechanism as well as the associated outcome indicators are transmitted from the L-base station 108 to the NG-base station 105 and/or to the maintenance unit 113. As an alternative, the L-base station 108 can also transmit only information about the successfully carried out switchover on the basis of the CS fallback mechanism to the NG-base station 105 and/or to the maintenance unit 113. If the mobile radio system does not have an interface for a direct exchange of information between the L-base station 108 and the NG-base station 105, then the information is transmitted via the core network 101, for example, via the switching unit 111 and the control unit 107, by the interface provided between these two units. If there is an interface between the L-base station 108 and the NG-base station 105, then the information can be transmitted via this interface. Already existing procedures can be used for the transmission of the information. It can be provided for the transmission to take place in a separate process that is carried out for transmitting the information. By the same token, it can be provided that the information is transmitted in a communication process between the base stations 105, 108, and this communication process is carried out on the basis of an additional event. An example of such a communication process is the exchange of information for carrying out the handover of a terminal device 104 from the NG-base station 105 to the L-base station 108 or vice versa. In one embodiment, the L-base station 108 can send the information directly to the maintenance unit 113 via an appropriate connection. In another embodiment, the transmission takes place via the core network 101. The information can be transmitted, for example, regularly at predefinable intervals.

The information registered by an L-base station 108 during an observation time period about the success of switchovers to the L-radio network 103 on the basis of the CS fallback mechanism and the information registered in the NG-base station 105 during the same observation time period about switchover attempts to the L-radio network 103 are evaluated in the NG-base station 105 and/or in the maintenance unit 113. In case of an evaluation in the maintenance unit 113, the NG-base station 105 transmits information about the registered switchover attempts directly to the maintenance unit 113 via an appropriate interface or via the core network 101. As a function of the results of the evaluation, network parameters used in the NG-base station 105 can be modified by the NG-base station 105 itself and/or by the maintenance unit 113.

In one embodiment, success and failure statistics are determined on the basis of the successful log-ons registered for a radio cell of the L-radio network 103 within the scope of the CS fallback mechanism and on the basis of the switchover attempts that were registered for this radio cell in the NG-base station 105 and that were carried out within the scope of the CS fallback mechanism. A failure rate can be determined that indicates the percentage of failed switchover attempts. Switchover attempts that have not led to a successful log-on of the terminal device in the sense defined above can be viewed as having failed. The failure statistics or the failure rate can be determined in the NG-base station 105 and/or in the maintenance system 113.

Based on the failure rate, those network parameters of the NG-base station can be determined or modified that have an influence on the selection of the target cell to which the terminal devices 104 are supposed to switch over within the scope of the CS fallback mechanism. The modification may be carried out in such a way that, at a high failure rate of a radio cell of the L-radio network 103, for example, when the failure rate exceeds a prescribed threshold value, this cell is used less frequently as the target cell for a CS fallback switchover or else is not employed for the selection of a target cell.

As explained below in greater detail, in one embodiment, it is provided that the NG-base station 105 selects the target cell for a switchover to the L-radio network 103 within the scope of the CS fallback mechanism on the basis of measured data about the reception quality of the radio signals of the available radio cells of the L-radio network 103. For this purpose, upon prompting by the NG-base station 105, the measured data is acquired by the terminal device 104 and transmitted to the NG-base station 105. On the basis of the failure rate for switchovers to a given radio cell, for example, a threshold value can be determined for the reception quality, the excess of which allows so that the target cell can be selected by the NG-base station 105. The threshold value may be determined by the maintenance unit 113 and transmitted to the NG-base station 105. The determination of the threshold value may be carried out by taking into account the determined failure rate, in such a way that an increase in the failure rate leads to an increase in the threshold value, so that a target cell for which a high failure rate has been determined is only taken into account for the CS fallback mechanism if it offers a high signal quality.

The claimed subject matter is not limited to the above-mentioned modifications of network parameters. Fundamentally, any desired modifications of the NG-base station 105 and/or of the maintenance system can be made as a function of the accesses registered in the L-base station 108 due to switchovers within the scope of the CS fallback mechanism as well as the associated outcome indicators and, if applicable, as a function of the switchover attempts registered in the NG-base station 105.

Figure 2:
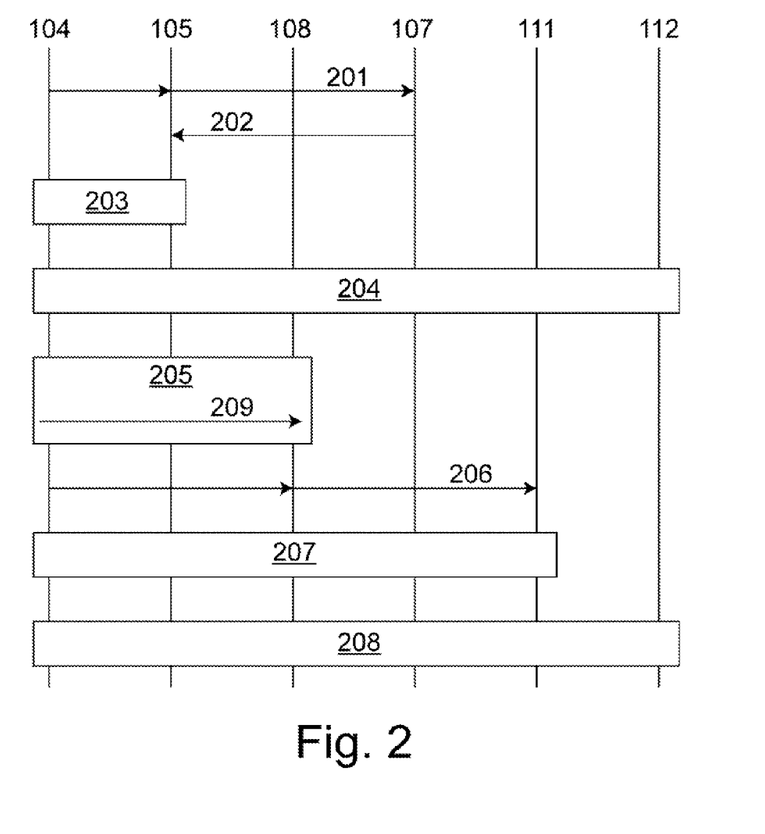

FIG. 2 shows examples of steps for switching over a terminal device 104 in order to establish a voice call on the basis of a CS fallback mechanism in an embodiment given by way of an example. The steps are carried out in order to establish an outgoing (MO) call that is initiated by the terminal device. For example, the initiation is performed by the user of the terminal device 104 when he/she appropriately operates the terminal device 104 in order to establish a voice call to another party that they have selected.

After the voice call has been initiated in the terminal device 104, the terminal device 104 sends a request to the control unit 107 (Step 201) via the NG-base station 105 to establish a voice call using the CS fallback mechanism. In Step 202, the control unit 107 then informs the NG-base station 105 about the request. The information sent to the NG-base station 105 contains the information that the call is to be established using the CS fallback mechanism. In this manner, the NG-base station 105 is informed about the fact that the terminal device 104 is to switch over to the L-radio network 103.

In one embodiment, after the information sent by the control unit 107 in Step 202 has been received, the NG-base station 105 determines the target cell of the L-radio network 103 to which the terminal device 104 is supposed to switch over, and it informs the terminal device 104 of the target cell. Moreover, the NG-base station 105 prompts the terminal device 104 to make the switchover to the selected target cell of the L-radio network 103.

The target cell can be predefined in the NG-base station 105. As already mentioned above, it can alternatively be provided that the NG-base station 105 prompts the terminal device 104 to acquire measured data about the reception quality of receivable signals of cells of the L-radio network 103 and to report back to the NG-base station 105. The measured data can contain, for instance, the signal strengths of the receivable signals. Based on the measured data, the NG-base station 105 then selects a target cell in the L-radio network 103. Here, in one embodiment, the cell with the best reception quality is selected from among all of the available cells of the L-radio network 103. In another embodiment, it can be provided that, for the selection, the only available cells taken into account are those for which a reception quality has been ascertained that exceeds a prescribed threshold value. As already mentioned above, the threshold value can be modified on the basis of the determined failure rate for switchovers made within the scope of the CS fallback mechanism so that target cells with a high failure rate are not taken into account at all, or else only in case of high reception quality.

Another embodiment provides that the L-radio network 103 is not selected by the NG-base station 105 but rather by the terminal device 104 itself. In this embodiment, in Step 203, the NG-base station 105 prompts the terminal device 104 to switch over to the L-radio network 103. Then the terminal device 104 makes the selection of the target cell of the L-radio network 103, for example, as a function of measured data about the reception quality of receivable signals of the available cells of the L-radio network itself.

In all of the above-mentioned embodiments, the request sent by the NG-base station 105 for carrying out the switchover to the L-radio network 103 may be registered in the NG-base station 105 as a switchover attempt.

If the selection of the target cell of the L-radio network 103 is made by the NG-base station 105 and if the mobile radio system supports this, optionally, an existing data connection of the terminal device 104 can be switched over to the L-radio network 103 and to the associated NG-gateway unit 106 via the NG-radio network 102 and the L-gateway unit 112 with the assistance of the control unit 107 within the scope of a so-called PS handover in a manner generally known to the person skilled in the art, so that, in addition to the circuit-switched connection that is established for the terminal device 104 via the L-radio network 103, a packet-switched data connection of the terminal device 104 is retained. Insofar as provided, steps can be taken to prepare the PS handover after the target cell has been selected in Step 204.

After the terminal device 104 has received the request in Step 203 to switch over to the L-radio network 103, then in Step 205, it logs on to the associated L-base station 108 in the target cell determined by the terminal device 104 itself or by the NG-base station 105. Within the scope of the log-on process, among other things, a signaling connection to the terminal device 104 is established, which may be subsequently used for the exchange of signaling messages with the terminal device 104. In one embodiment, the signaling connection is established on the basis of a request that is sent by the terminal device 104 to the L-base station 108. The request can be contained in an RRC connection request message.

After the signaling connection has been established, the device 104 requests the establishment of the desired voice call. For this purpose, in Step 206, a request message to this effect is sent by the terminal device 104 to the switching unit 111 via the L-base station 108. Then, in Step 207, as requested by the terminal device 104, the voice call is established via a circuit-switched connection via the switching unit 111. Moreover, the PS handover can be completed if it is provided that it is to be carried out (Step 208).

The information that the switchover of the terminal device 104 is being carried out on the basis of a CS fallback is reported to the L-base station 108 by the terminal device 104 during the log-on process or in a message sent to the L-base station 108 after the log-on process. The information may be integrated into a message sent by the terminal device 104 to the L-base station 108. By way of an example, on the basis of Step 209, FIG. 2 illustrates the transmission of such a message during the log-on to the L-base station 108. The information can be configured as a flag that is set within the envisaged message when the switchover is carried out on the basis of the CS fallback mechanism, and otherwise it remains unset or is not present. In one embodiment, it is provided that the information is integrated into the request to establish the signaling connection. In case of a switchover to a 3G network, this is, for example, the RRC connection request message. In one embodiment, the information can be integrated—as a so-called "cause value" of a "cause value" type that has been set up with respect to the CS fallback mechanism—into a message to the L-base station 108. This type can augment other types that might optionally be provided in the message.

In response to receiving the information described above, the log-on of the terminal device 104 is registered by the L-base station 108 as a log-on within the scope of the CS fallback mechanism, together with the outcome indicator ascertained for the log-on. In one embodiment, the outcome indicator for the success case is then set by the L-base station 108 once it has ascertained the successful call establishment in Step 207. If the log-on fails prior to that, the outcome indicator is set to the failure case. If a PS handover is carried out, then, for example, it can likewise be provided that the outcome indicator of the success case is only set if the call was established successfully in Step 207 and the PS handover in Step 208 was completed successfully.

Information about the registered log-ons that have been carried out within the scope of the CS fallback mechanism are sent in the manner described above from the L-base station 108 to the NG-base station 105 and/or to the maintenance unit 113.

Figure 3:
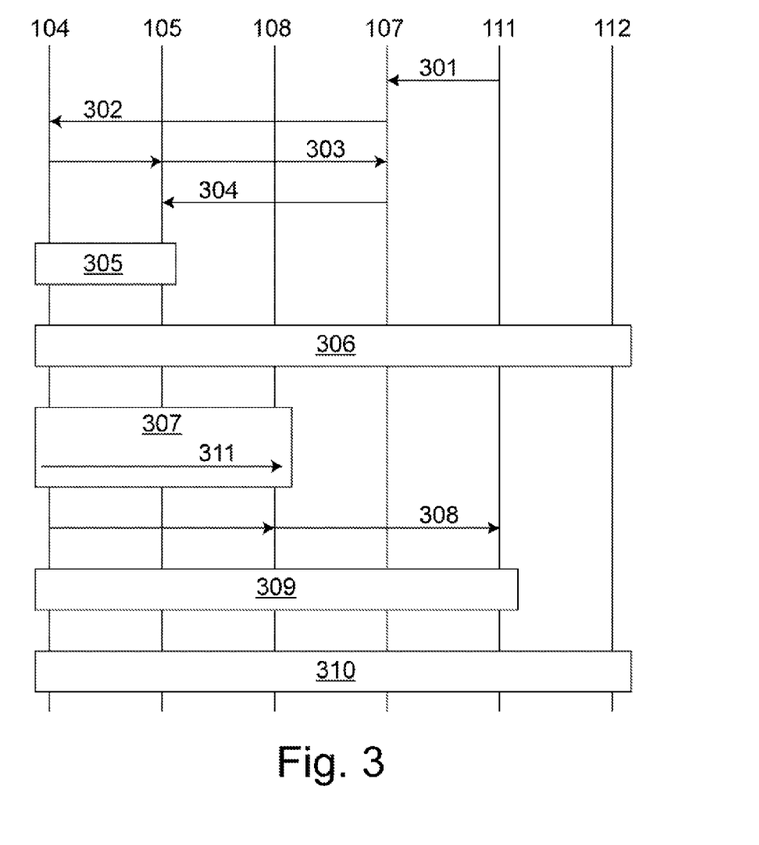

By way of an example, FIG. 3 shows steps for establishing an incoming (MT) call in which the terminal device 104 switches over from the NG-radio network 102 to the L-radio network 103 within the scope of the CS fallback mechanism in order to accept and establish the call.

The incoming call is first signaled to the switching unit 111 that is associated with the L-radio network 103. In Step 301, the switching unit 111 then reports the incoming call to the control unit 107 associated with the NG-radio network 102. Insofar as no data connection via the NG-radio network 102 and the NG-gateway unit 106 is active for the terminal device 104, in Step 302, the control unit 107 sends a special paging call via the NG-radio network 102 and this paging call signals (CD paging) the call as well as the switchover to the L-radio network 103 that is necessary in order to accept the call within an area where the terminal device 104 is located in the NG-radio network 102. If an active data connection exists for the terminal device 104, instead of the paging call in Step 302, a notification is sent from the control unit 107 to the terminal device 104 informing the terminal device 104 about the call and about the switchover to the L-radio network 103 that is necessary in order to accept the call. The terminal device 104 answers the paging call or the notification in Step 303 with a message to the control unit 107 in which it accepts the voice call and requests a switchover to the L-radio network 103 within the scope of the CS fallback mechanism.

In Step 304, the control unit 107 informs the NG-base station 105 via which the terminal device 104 is connected to the NG-radio network 102 that the terminal device 104 should switch over to the L-radio network 103 within the scope of the CS fallback mechanism. This step corresponds to Step 202 that was described above for FIG. 2. On the basis of the transmission of the prompt to the terminal device 104 to carry out the switchover, the NG-base station 105 also registers an attempt to switch over to the L-radio network 103 or to the selected target cell within the scope of the CS fallback mechanism. Subsequently, the terminal device 104 is prompted in Step 305 to make the switchover to the L-radio network 103, and the target cell of the L-radio network is determined. This is done in the same manner as explained above in conjunction with Step 203 of FIG. 2. In Step 306, a PS handover for switching over an active data connection of the terminal device 104 can optionally be carried out in the same manner as in Step 204 of FIG. 2. In Step 307, the terminal device 104 in the selected target cell of the L-radio network 103 logs on to the associated L-base station 108, and a signaling connection to the terminal device 104 is established. This is done in the way explained above in conjunction with Step 205 of FIG. 2.

After the signaling connection is established, in Step 307, the terminal device 104 sends a message via the L-base station 108 to the switching unit 111 with which it indicates to the switching unit 111 that it is ready to accept the waiting call. Then, in Step 309, the voice call is established via a circuit-switched connection to the terminal device 104. In a further Step 310, an optionally carried out PS handover can be completed in order to switch over the optionally existing data connection of the terminal device 104 to the L-radio network 103 and to the associated L-gateway unit 112.

In the same manner as described above with respect to FIG. 2, the terminal device 104 informs the L-base station 108 that supplies the feed to the target cell of the terminal device 104 about the fact that the switchover to the L-radio network 103 has been carried out within the scope of the CS fallback mechanism. As described above, this is done in an implementation within the process of logging on to the L-base station 108, for example, by information that is integrated into the request to establish the signaling connection. For example, the transmission of the information during the log-on process is shown in FIG. 3 on the basis of the Step 311 that is integrated into Step 307.

The L-base station 108 registers the log-on on the basis of the receipt of the information as a switchover within the scope of the CS fallback mechanism together with the outcome indicator determined for the log-on. In one embodiment, the outcome indicator for the success case is then set by the L-base station 108 analogously to the outgoing call described above once it has ascertained in Step 309 that the call has been successfully established. If the log-on fails before that, the outcome indicator is set to indicate the failure case. If a PS handover is envisaged, however, it can also be provided for incoming calls, for instance, that the outcome indicator for the success case is only set if the call was established successfully in Step 309 and the PS handover was successfully completed in Step 310.

As described above, the information about the registered switchover within the scope of the CS fallback mechanism is sent by the L-base station 108 to the NG-base station 105 and/or to the maintenance unit 113.

Although the claimed subject matter has been described in detail in the figures and in the presentation given above, the presentations merely serve as an illustration and an example and should not be construed in a limiting manner. The claimed subject matter is not limited to the explained embodiments. The person skilled in the art can glean additional variants of the claimed subject matter and their execution from the preceding disclosure, from the figures and from the claims.

In the claims, terms such as "encompass", "comprise", "contain", "have" and the like do not exclude additional elements or steps. Moreover, the use of the indefinite article does not preclude the plural. An individual component can execute the functions of several of the units cited in the claims. The reference numerals given in the claims are not to be construed as a limitation of the approaches employed.

What is claimed is:

1. A method for switching over a mobile terminal device from a first radio network of a mobile radio system to a second radio network of the mobile radio system, whereby switching over is carried out on the basis of a circuit-switched (CS) fallback mechanism, and whereby, on the basis of switching over, the mobile terminal device logs on to a base station of the second radio network in order to establish a connection, wherein, in conjunction with logging-on, the mobile terminal device transmits a notification to the base station of the second radio network station indicating that the CS fallback mechanism has been used, and the base station registers a log-on of the terminal device as a function of the notification, the method comprising an optimization step, wherein at least one network parameter of the first radio network and/or the second radio network is modified as a function of information about radio network switchovers within the scope of the CS fallback mechanism, and the information is registered in the base station of the first radio network and/or the second radio network for a plurality of radio network switchovers, whereby a failure rate is ascertained based on log-ons that have been registered in the base station of the second radio network and associated outcome indicators, and switchover attempts registered in the base station of the first radio network, and according to this failure rate, at least a network parameter is modified in the optimization step.

2. The method according to claim 1, whereby a checking procedure is carried out to ascertain whether the log-on of the terminal device to the base station of the second radio network is successful, and the log-on of the terminal device is registered, together with an outcome indicator that is determined as a function of a result of the checking procedure.

3. The method according to claim 1, whereby a base station of the first radio network prompts the terminal device to carry out switching over and, on the basis of prompting, the base station of the first radio network registers a switchover attempt has been made within scope of the CS fallback mechanism.

4. The method according to claim 3, whereby the log-on of the terminal device is registered in the base station of the second radio network and/or the switchover attempt is registered in the base station of the first radio network pertaining to a specific radio cell of the second radio network that receives its feed from the base station of the second radio network.

5. The method according to claim 1, whereby information about the log-ons registered in the base station of the second radio network and/or the associated outcome indicators are transmitted from the base station of the second radio network to the base station of the first radio network, and whereby the optimization step is carried out in the base station of the first radio network.

6. The method according to claim 5, whereby the information about the log-ons registered in the base station of the second radio network and/or the associated outcome indicators are transmitted from the base station to a maintenance unit of the mobile radio network, and whereby the optimization step is carried out in the maintenance unit.

7. The method according to claim 6, whereby, in a request to establish a signaling connection, a notification pertaining to the CS fallback mechanism is transmitted from the mobile terminal device to the base station of the second radio network.

* * * * *